April 7, 1942.    J. H. WILSON    2,278,960
ADJUSTING DEVICE FOR CLUTCH ELEMENTS AND THE LIKE
Filed Dec. 7, 1939    2 Sheets-Sheet 1
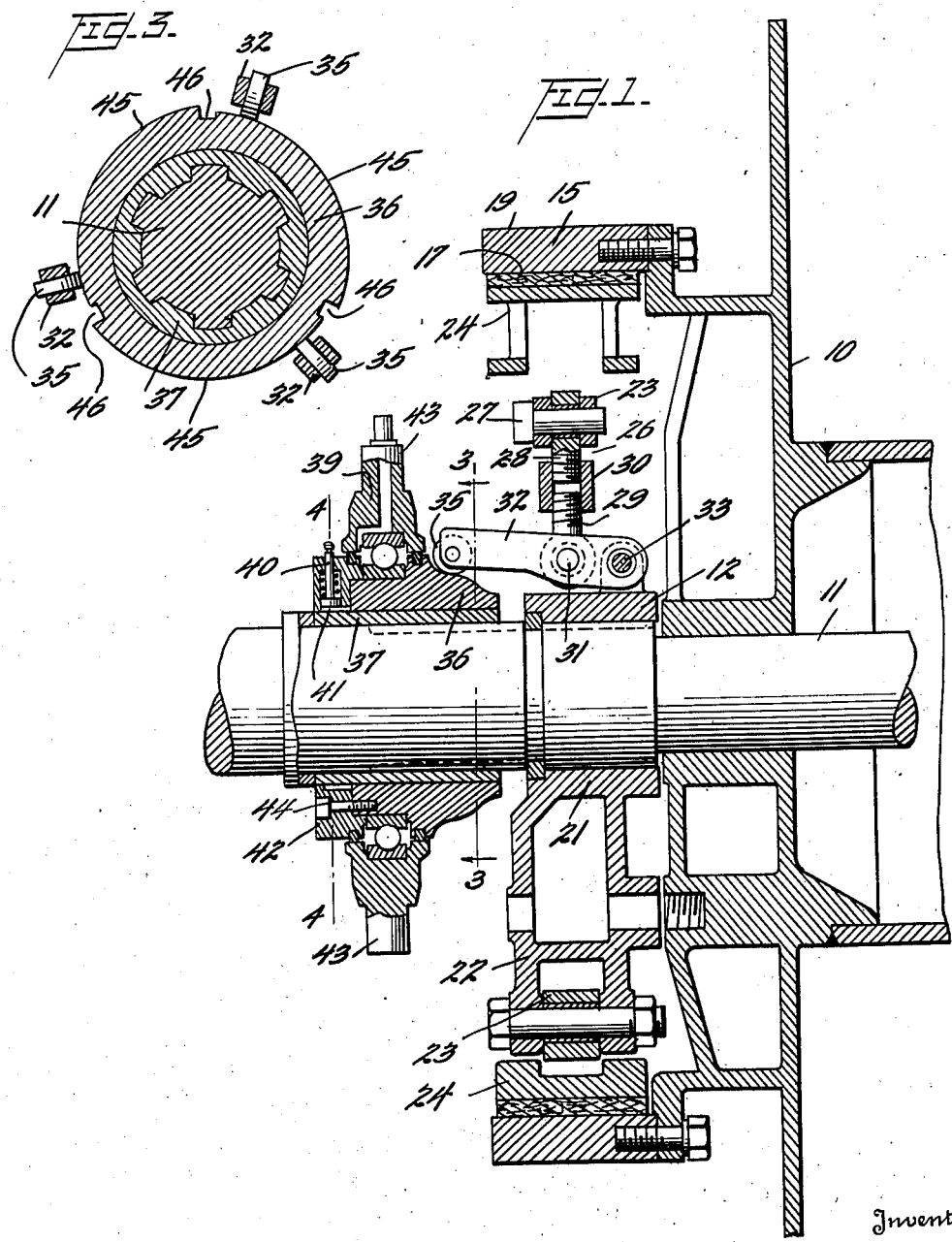

April 7, 1942. J. H. WILSON 2,278,960
ADJUSTING DEVICE FOR CLUTCH ELEMENTS AND THE LIKE
Filed Dec. 7, 1939 2 Sheets-Sheet 2
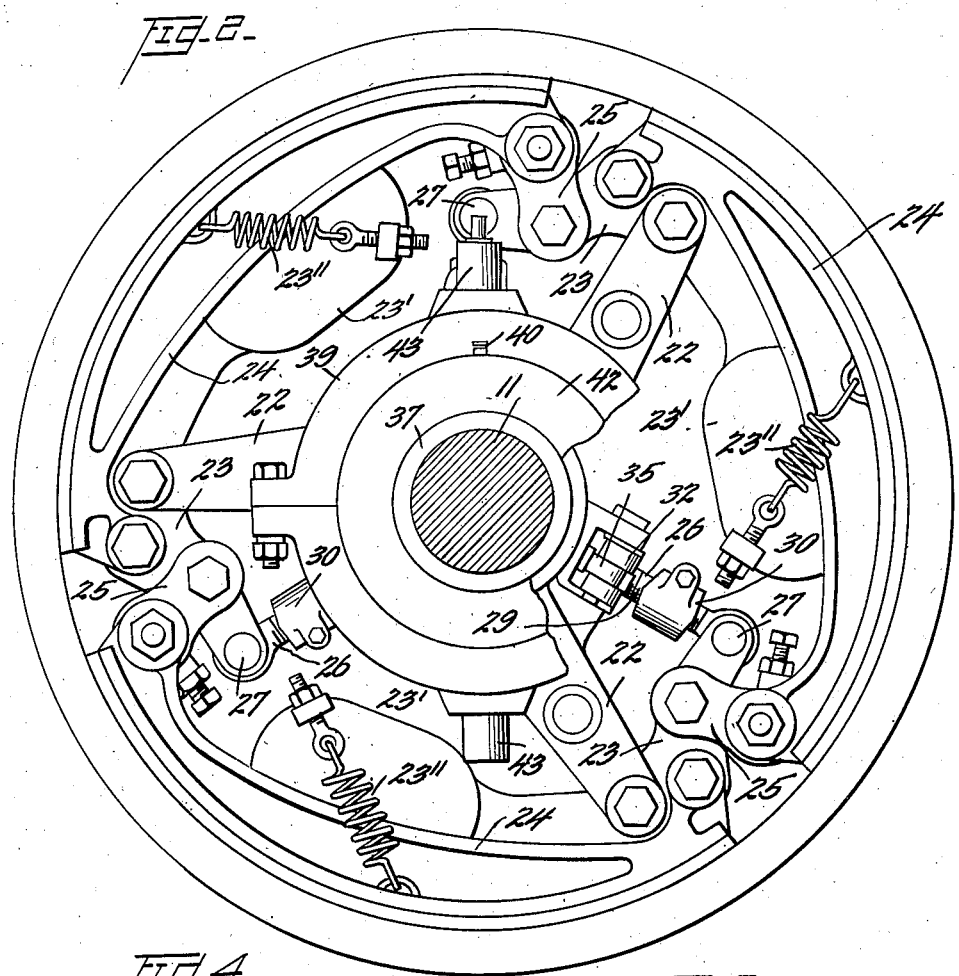
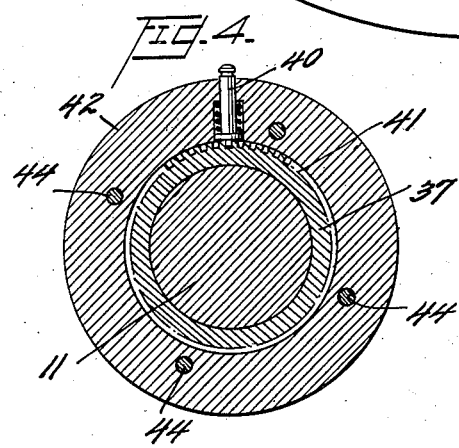
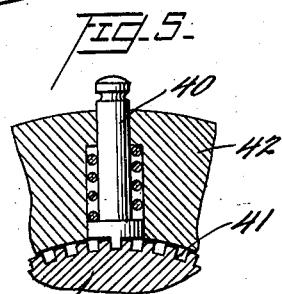
Inventor
John Hart Wilson
By Watson, Cole, Grindle &
Watson
Attorney Patented Apr. 7, 1942

2,278,960

UNITED STATES PATENT OFFICE 2,278,960

ADJUSTING DEVICE FOR CLUTCH ELEMENTS AND THE LIKE

John Hart Wilson, Wichita Falls, Tex.

Application December 7, 1939, Serial No. 308,035

3 Claims. (Cl. 192—93)

This invention relates to friction clutches and the like, and more particularly to novel and convenient means for adjusting the relationship of the friction elements in a clutch or brake mechanism, and constitutes an improvement, in certain respects, upon the friction clutch described and illustrated in my copending application Serial No. 222,514, which has now become United States Patent No. 2,251,862, issued Aug. 5, 1941.

The features and advantages of the general type of clutch mechanism embodied in the present disclosure are fully set forth in said copending application and need not be more fully described herein. In addition, the novel features of the present invention may be applied to other mechanisms than that described in the aforesaid application, and the present invention is not limited to use in connection with clutches and brakes, although the principal usefulness of the invention, so far as I am now aware, lies in that field, and particularly in the field of internal expanding brakes and clutches.

Most types of internal expanding clutches and brakes comprise a driven member having an internal clutch or brake surface, and a driving member comprising a plurality of friction elements, lying within the space defined by such surface and adapted to be moved outwardly into engagement therewith. It is essential to the proper operation of such devices that the several friction elements shall engage the cylindrical clutch or brake surface simultaneously and uniformly, that is, with substantially equal pressure. In the course of time, as the cooperating surfaces and the operating mechanism are subjected to wear, it becomes necessary to adjust the friction elements in order that they may continue to engage the clutch or brake surface with the requisite pressure. If the mechanism is properly constructed, the wear on the several friction elements and their operating linkages will be substantially equal, and the necessary adjustments should likewise be substantially equal.

It is the general object of the present invention to provide means whereby the several friction elements of an expanding brake or clutch, or similar mechanism, may be adjusted equally and simultaneously, with minimum effort and maximum convenience.

A further object of the present invention is the provision of adjusting means of the type described, so arranged that when the position of one friction element is adjusted, a corresponding adjustment is automatically and necessarily effected upon the remaining friction elements.

Another object is the provision of adjusting means, in combination with the clutch operating means, comprising a clutch operating cam which is so constructed and arranged as to actuate the friction elements when the cam is moved axially, and to adjust the throw of the friction elements when the cam is rotated.

A further object is the provision of adjusting means comprising a cam which is sloped both axially and circumferentially, whereby the friction elements may be actuated by an axial movement of the cam, or adjusted by a rotation of the cam.

Another object is the provision of adjusting means comprising a cam which has the general shape of an annulus, but whose surface is divided into a plurality of sections, each section being sloped both axially and circumferentially, and each surface corresponding to one of the friction elements of a clutch or like mechanism.

A further object is the provision of adjusting means of the character described, the clutch-actuating and operating cam being mounted for both axial and rotational movements, in combination with means for normally preventing rotation of the cam.

Other and further objects, features and advantages of the present invention will be apparent to one skilled in the art from the following description taken in connection with the accompanying drawings in which:

Figure 1 is a vertical longitudinal section through a clutch mechanism provided with adjusting means in accordance with the present invention;

Figure 2 is an end elevation of the mechanism of Figure 1;

Figure 3 is a transverse section on line 3—3 of Figure 1;

Figure 4 is a transverse section on line 4—4 of Figure 1; and

Figure 5 is an enlarged fragmentary detail showing a portion of the mechanism of Figure 4.

In order to facilitate an understanding of the invention, reference is made to the embodiment thereof shown in the accompanying drawings and detailed descriptive language is employed. It will nevertheless be understood that no limitation of the invention is thereby intended and that various changes and alterations are contemplated such as would ordinarily occur to one skilled in the art to which the invention relates.

Referring to Figures 1 and 2, the internal expanding clutch illustrated therein is generally similar to that described and illustrated in my aforesaid copending application, and comprises generally a driven member 10, journalled on a shaft 11, and a driving member 12 secured on the shaft 11 by any suitable means. The shaft 11 and driving member 12 may be driven from any suitable external source of power (not shown).

The driven member 10 may, for example, comprise a pulley, drum, or other desired driven member, and is provided with a cylindrical portion 15, which may be formed integrally therewith or secured thereto in any suitable manner. The cylindrical portion 15 is provided with an internal clutch surface 17, and an outer braking surface 19. The driving member 12 comprises a hub 21 having a plurality of radial arms 22 on each of which is pivoted a lever 23, three such radial arms 22 and levers 23 being provided in the illustrated embodiment. Each of the three friction elements 24 is connected between adjacent levers 23, as more fully described in my aforesaid application, the trailing end of each friction element being pivotally connected to the adjacent lever 23, while the leading end of the next friction element is connected to the same lever 23 through a link 25. Suitable means, such as centrifugal members 23' and springs 23'' are employed for normally maintaining the levers 23 in the position in which the friction elements 24 are disengaged from the clutch surface 17.

A compression member 26 is pivoted at the rearward extremity of each lever 23, as at 27 (Figure 2), and comprises two oppositely threaded portions 28 and 29 (Figure 1) connected by an oppositely threaded split nut 30, for adjusting the length of the compression member. The inner threaded portion 29 is pivoted, as at 31, to a cam lever 32 which in turn is pivoted as at 33 on the hub 21 of the driving member.

Each cam lever 32 is provided at its distal end with a cam follower roller 35, for engagement with a slidable cam 36. The latter is rotatably mounted on a sleeve 37 which is splined on the shaft 11, rotation of the cam 36 relative to the sleeve being normally prevented by the toothed spring pressed plunger 40, which normally engages between adjacent teeth of an annular series 41 formed on the sleeve 37 (Figures 4 and 5). The collar 42, in which plunger 40 is mounted, is bolted or otherwise secured to cam 36 as at 44 (Figure 1). The cam 36 may be shifted axially of the shaft 11, to engage and disengage the clutch, by means of a shifter yoke 39 journalled on the cam 36, the yoke 39 being provided with suitable trunnions 43 for engagement with a manually operated lever, not shown.

From the foregoing description it will be apparent that when the cam 36 is moved to the right in Figure 1 the cam levers 32 will be rocked outwardly, thus causing the compression members 26 to rock the levers 23, which in turn causes the friction elements 24 to engage the clutch surface 17, as more fully described in my aforesaid copending application. As the friction surfaces of the friction elements 24, and the bearing surfaces in the associated linkages, become worn through use, it becomes necessary to alter the throw of the cam levers 32 so as to cause the compression members 26 to be moved farther outwardly when the clutch is to be engaged. This adjustment may be effected in the manner now to be described.

As best seen in Figures 1 and 3, the cam 36 is of a peculiar conformation adapted to serve the functions of a clutch operating cam and also an adjusting cam. In the present embodiment, since three radial compression members 26 and three cam levers 32 are provided, the surface of the cam 36 is divided into three portions 45, each adapted for engagement with one of the cam follower rollers 35. The three portions 45 of the cam surface are separated by narrow grooves 46, and each portion 45 is sloped longitudinally or axially, as illustrated in Figure 1, and also circumferentially, as illustrated in Figure 3. The expression "circumferentially sloped" as used herein and in the appended claims, refers to the fact that the radius of curvature of each circumferential element of a surface 45 increases gradually from one edge to the other of said surface. In the present case, the radius of curvature of the surfaces 45 as illustrated, increases in a clockwise direction, but obviously the opposite arrangement would be equally satisfactory.

As described above, when the cam 36 is moved axially by means of the shifter yoke 39, the levers 32 are raised, bringing the friction elements 24 into engagement with the clutch surface 17. When, by reason of wear, it becomes necessary to adjust the relation of the friction elements 24 to the clutch surface 17, the plunger 40 is retracted out of engagement with the teeth 41 on the sleeve 37, a suitable tool is applied to the cam 36, and the latter is rotated (counterclockwise in Figure 3 of the present embodiment) so as to cause each cam follower roller 35 to engage a higher portion of its respective cam surface 45. The plunger 40 is then released and again engages between two of the teeth 41 formed on the sleeve 37, thus preventing further rotation of the cam 36 relative to the sleeve.

From the foregoing it is apparent that the relation of the three friction elements to the clutch surface 17 may be simultaneously and uniformly adjusted, whenever such adjustment becomes necessary. Initial adjustment of the several friction elements into a uniform relation with the clutch surface 17 may of course be effected by adjusting the length of the respective compression members 26, which may be done by rotating the split nuts 30.

Obviously, the usefulness of the present invention is not limited to clutches, but extends generally to devices in which a series of radially extending elements are required to be adjusted from time to time in a uniform manner. Many such applications will occur to those skilled in the art to which the present invention relates.

Having thus described the invention, what is claimed as new and desired to be secured by Letters Patent is:

1. In a clutch mechanism, a driving member, a driven member having a clutch surface, and means carried by said driving member for operatively connecting said driving and driven members, said means comprising a plurality of friction elements carried by said driving member and movable into engagement with said clutch surface, and means for moving said friction elements into engagement with said clutch surface, said last means comprising compression members associated with said friction elements and extending toward the axis of said driving member, levers pivoted on said driving member and operatively connected to said compression members, cam followers carried by said levers, a cam encircling said driving member and engaging said cam followers, said cam being movable axially of said driving member for actuating said levers and having a plurality of surfaces, one for each said lever, each said cam surface being sloped both axially and circumferentially, said cam being rotatable relative to said driving member whereby the points of engagement of said cam surfaces and said cam followers may be varied radially for adjusting the relation of said friction elements to said clutch surface and the weight of the cam being substantially evenly distributed about said axis, so that no unbalanced forces are imposed upon the driving member when the cam and member are rotated, and means for locking said cam in any desired position of adjustment on said shaft.

2. In a clutch mechanism, in combination, a driven member having a cylindrical clutch surface, a driving member, a plurality of radially movable elements associated with said driving member and adapted to be thrust outwardly to frictionally engage the clutch surface of the driven member, a cam movable in a path, and rotatable about an axis, perpendicular to the plane in which said elements are radially movable, for actuating the latter, and cam followers associated with said elements and engaging said cam, said cam having a plurality of similar surfaces arranged in a circular series, one for each element, each said cam surface being sloped both axially and circumferentially, and the weight of said cam being substantially evenly distributed about said axis, said cam being rotatable relatively to said elements whereby the points of engagement of said cam and said cam followers may be adjusted radially.

3. The combination set forth in claim 2 in which the cam is mounted for free rotation about its axis and a manually adjustable locking device is provided to retain said cam in any desired position of adjustment.

JOHN HART WILSON.